M. L. SCIVALLEY.
Sulky Revolving-Harrow.
No. 220,210. Patented Sept. 30, 1879.
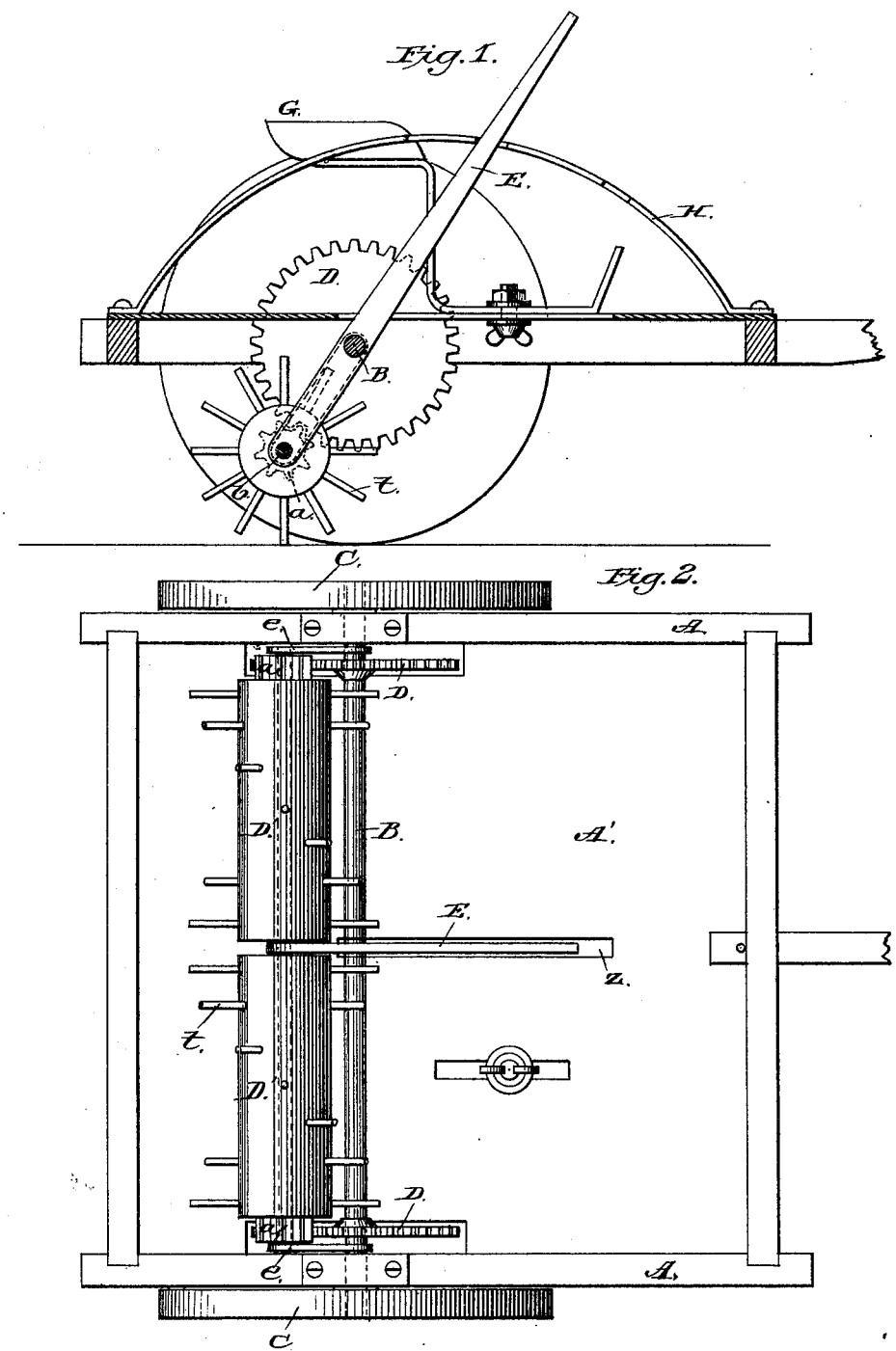

UNITED STATES PATENT OFFICE.

MARTIN L. SCIVALLEY, OF WINCHESTER, TENNESSEE.

IMPROVEMENT IN SULKY REVOLVING HARROWS.

Specification forming part of Letters Patent No. 220,210, dated September 30, 1879; application filed July 12, 1879.

*To all whom it may concern:*

Be it known that I, MARTIN L. SCIVALLEY, of Winchester, in the county of Franklin and State of Tennessee, have invented a new and valuable Improvement in Sulky Revolving Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal central section of my improved harrow, and Fig. 2 is a bottom view thereof.

This invention has relation to improvements in rotary harrows; and the nature of the invention consists in the novel arrangement and construction of the various parts used, whereby a rotary harrow of exceptional excellence is produced, as will be hereinafter more fully described.

In the accompanying drawings, the letter A designates the frame of my improved harrow, the same being usually of rectangular form, and constructed either of wood or iron, or a combination thereof, as may be preferred. This frame has a platform, A′, extending around the edges thereof, to protect the driver from dust and dirt, and is sustained by an axle, B, and transporting-wheels C, the former having suitable bearings in the said frame. Upon this axle, inside of the side bars of the frame A, are keyed or otherwise secured the gear-wheels D, engaging pinions $a$ upon a rotary shaft, $b$, having its bearings in hangers $e$, depending from the axle and vibrating freely thereon. Upon this axle are independently secured in any suitable manner the drums D′, having a series of teeth, $t$, arranged in spirals, projecting therefrom. These teeth are usually inserted and jammed into seats in the drums D′, and these drums may be made of iron or wood, as may be deemed expedient.

It will be clear from the foregoing description that the forward motion of the sulky-harrow will cause a rotary motion to be imparted to the drums, thereby forcing the teeth $t$ into the soil, and breaking up and pulverizing any clods with which it may come in contact.

The drums have one or more series of teeth, and where more than one series of teeth are used these latter are so arranged that the teeth of one series alternate with those of the other. The consequence is that the soil passed over by the rollers is thoroughly crushed and mellowed and brought into condition for planting.

E indicates a lever, having its fulcrum on the axle, connected to the rotary shaft $b$, usually between the drums D′, and extending up through a slot, $z$, in the platform A′, within reach of the driver's seat G. This lever traverses in its vibrations an arched rack, H, erected on said platform of the sulky, and when in a vertical position, or nearly so, the teeth have their deepest penetration into the ground. By thrusting this lever to the front the shaft $b$, upon which are the drums D′, is raised, and the harrow-teeth adjusted for a greater or less penetration into the ground, as may be required, this adjustment being maintained by engaging the said lever with a notch of the rack H; or the said teeth may be raised out of the ground altogether, and the apparatus driven from place to place.

What I claim as new, and desire to secure by Letters Patent, is—

A sulky revolving harrow, consisting of the rectangular frame A, having the platform A′, the axle B, journaled in said frame, the transporting-wheels C and gears D on said axle, and the hangers $e$ depending therefrom, the shaft $b$, having independent drums D′, provided with pinions $a$, connecting said hangers $e$ and rotating thereon, the lever E on shaft $b$, interposed between said drums D′, fulcrumed on axle B and extending up through the slot $z$ in said platform, and engaging the controlling-rack H, substantially as specified.

In testimony that I claim the above I have hereunto subscribed my name in the presence of two witnesses.

MARTIN L. SCIVALLEY.

Witnesses:
GEORGE R. MARTIN,
JOHN F. GREGORY.